(12) United States Patent
Iwami et al.

(10) Patent No.: US 6,744,341 B2
(45) Date of Patent: Jun. 1, 2004

(54) POLARIZING DEVICE FOR A PERMANENT MAGNET ROTOR

(75) Inventors: Taizo Iwami, Tokyo (JP); Naoki Kajita, Tokyo (JP); Hisanori Uozumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 223 days.

(21) Appl. No.: 09/903,815

(22) Filed: Jul. 13, 2001

(65) Prior Publication Data

US 2002/0027490 A1 Mar. 7, 2002

(30) Foreign Application Priority Data

Aug. 10, 2000 (JP) ...................................... P2000-241951

(51) Int. Cl.[7] .................................................. H01H 9/00
(52) U.S. Cl. ........................ 335/284; 310/154; 361/143
(58) Field of Search ........................ 335/284, 302–306; 361/143; 310/154–156, 172

(56) References Cited

U.S. PATENT DOCUMENTS 5,200,729 A * 4/1993 Soeda et al. ................. 335/284
5,861,696 A    1/1999 Hartman et al.

FOREIGN PATENT DOCUMENTS

| DE | 44 17 903 A1 | 11/1995 |
| JP | 61-52143 A | 3/1986 |
| JP | 6-38459 | 2/1994 |
| JP | Hei 9-163692 | 6/1997 |
| JP | 9-163692 | 6/1997 |
| JP | Hei 10-336976 | 12/1998 |
| WO | WO 99/35729 A2 | 7/1999 |

* cited by examiner

Primary Examiner—Lincoln Donovan
(74) Attorney, Agent, or Firm—Burns, Doane, Swecker & Mathis, L.L.P.

(57) ABSTRACT

A polarizing device includes: a polarizing iron core (13) facing to a specified number of permanent magnets (11) among plural unmagnetized permanent magnets (11) arranged at specified intervals circumferentially on a rotor (12); a first coil (15) wound at a position facing to a desired permanent magnet (11a) of the polarizing iron core (13); a pair of second coils (16) each arranged having a specified interval according to the first coil (15) circumferentially on the polarizing iron core (13) and whose direction of the flowing current is different from that of the first coil (15); and a power source (22) for supplying the current to the first and second coils (15, 16), and either of the permanent magnet (11a) and first coil (15) is relatively moved and each permanent magnet (11) is magnetized to form a magnetic pole in turn by the current fed from the power source (22).

12 Claims, 5 Drawing Sheets

FIG.5
Conventional
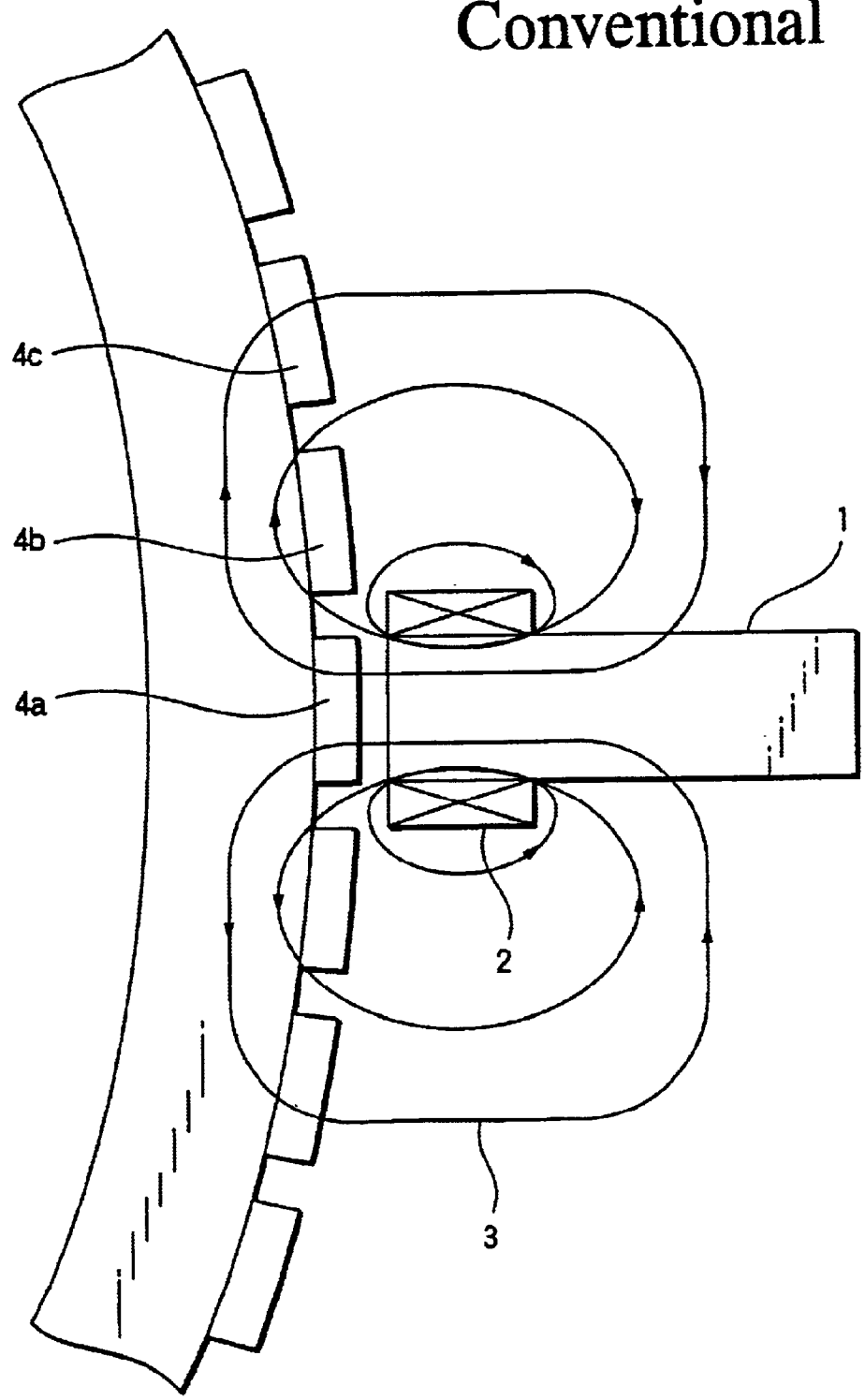

POLARIZING DEVICE FOR A PERMANENT MAGNET ROTOR

BACKGROUND OF THE INVENTION

1. Field of the Invention

This invention relates to a polarizing device in which unmagnetized permanent magnets arranged on the peripheral surface of a rotor are magnetized to form magnetic poles in turn.

2. Description of the Related Art

Previously, in magnetic poles of a permanent magnet rotor using the permanent magnet as the magnetic pole of the rotor, there are a case where the magnetic pole is assembled to the rotor after being polarized, and a case where the unmagnetized magnetic pole that has not magnetized yet is polarized and magnetized after being assembled to the rotor.

However, in the case where the magnetic pole is previously polarized and is assembled to the rotor, a strong suction force acts and the assembly work becomes difficult, and therefore, in a large-sized rotor, the case where the magnetic pole is polarized after being assembled is general.

As a conventional polarizing device of a permanent magnet rotor of this kind, for example, as shown in Japanese Patent Application Laid-Open No. 9-163692 which is not shown in the figure, a device is disclosed, where the polarizing iron core is arranged around the rotor and in the meantime, a coil is wound at a position respectively corresponding to each unmagnetized permanent magnet of the rotor of this polarizing iron core, and by letting the current flow in each of these coils, respectively so that the directions of the flow of the adjacent fellow coils may be different, each unmagnetized permanent magnet is magnetized and polarized to a magnetic pole of N-pole or S-pole alternately.

However, in the case of the described polarizing device of a permanent magnet rotor, the device becomes large-sized since the polarizing iron core is arranged around the rotor, and therefore, for example, in Japanese Patent Application Laid-Open No. 10-336976, a method is disclosed, where at a position corresponding to either of the respective unmagnetized permanent magnets of the rotor, a polarizing iron core of one pole on which a coil is wound is arranged and polarized, and after that, by relatively moving the rotor or the polarizing iron core by a pitch of the unmagnetized permanent magnet while switching in turn the direction of the current flowing in the coil, each unmagnetized permanent magnet is magnetized one by one in turn, and is alternately polarized to N-pole or S-pole, and consequently, miniaturization is achieved.

The conventional polarizing device of a permanent magnet rotor achieves the miniaturization as a device, as described above, in such a way that the polarizing iron core for one pole on which a coil is wound is magnetized while switching the direction of the current flowing in the coil in turn and corresponding to each unmagnetized permanent magnet and is polarized to N-pole or S-pole, and therefore, as shown in FIG. 5, in the case where the magnetic flux 3 is generated by the current flowing in the coil 2 wound on the polarizing iron core 1 and for example, the corresponding unmagnetized permanent magnet 4a is polarized to S-pole, as clear from the distribution of the magnetic flux 3 in the figure, the magnetic flux 3 passes through the respective unmagnetized permanent magnets 4b, 4c near the unmagnetized permanent magnet 4a in the opposite direction of the magnetizing direction and the polarization is performed in the opposite direction of the direction in which the magnetizing should be performed, and therefore, in the case where the polarizing is normally performed in the desired direction at a position corresponding to the polarizing iron core 1, the polarizing in the reverse direction must be demagnetized and therefore, it is necessary to change the current flowing in the coil 2 each time, and there has been such a problem that the control of the current becomes difficult.

Furthermore, in the case where the unmagnetized permanent magnet is a rare earth magnet, the demagnetizing is difficult and the re-magnetizing needs a considerably strong magnetic field when compared with the unmagnetized one, and there has been such a problem that the current supplying unit becomes large-sized.

SUMMARY OF THE INVENTION

This invention is made to solve the described problems, and it is an object to provide a polarizing device of a permanent magnet rotor in which the effect of the opposing magnetic field is eliminated and the control of the current is easy.

According to a first aspect of the invention, there is provided a polarizing device for a permanent magnet rotor, comprising: a polarizing iron core arranged facing to a specified number of permanent magnets among a plurality of unmagnetized permanent magnets arranged at specified intervals in the circumferential direction on the peripheral surface of a rotor; a first coil wound at a position facing to a desired permanent magnet of the polarizing iron core; a pair of second coils each of which is arranged having a specified interval on the basis of the first coil in the circumferential direction on the polarizing iron core and whose direction of the flowing current is different from that of the first coil; and a power source for supplying the current to the first and second coils, wherein either of the permanent magnet and first coil is relatively moved and each permanent magnet is magnetized to form a magnetic pole in turn by the current fed from the power source.

According to a second aspect of the invention, there is provided the polarizing device for a permanent magnet rotor according to the first aspect, wherein each second coil is arranged having an interval corresponding to at least three permanent magnets with the first coil.

According to a third aspect of the invention, there is provided the polarizing device for a permanent magnet rotor according to the first aspect, wherein the second coils are wound in the direction different from that of the first coil.

According to a fourth aspect of the invention, there is provided the polarizing device for a permanent magnet rotor according to the third aspect, wherein the second coils are wound by a number of windings of half the number of windings of the first coil or less.

Furthermore, according to a fifth aspect of the invention, there is provided the polarizing device for a permanent magnet rotor according to the first aspect, wherein a notch part for expanding the clearance with the permanent magnet is formed near both sides of the first coil of the polarizing iron core.

Furthermore, according to a sixth aspect of the invention, there is provided the polarizing device for a permanent magnet rotor according to the first aspect, wherein the permanent magnet is relatively moved by rotating the rotor.

BRIEF DESCRIPTION OF THE DRAWINGS

FIG. 5 is a figure showing the state of distribution of magnetic flux in a conventional polarizing device of a permanent magnet rotor.

DETAILED DESCRIPTION OF THE PREFERRED EMBODIMENTS

The preferred embodiments of this invention will be described below according to the drawings.

(Embodiment 1)

Figure 1:
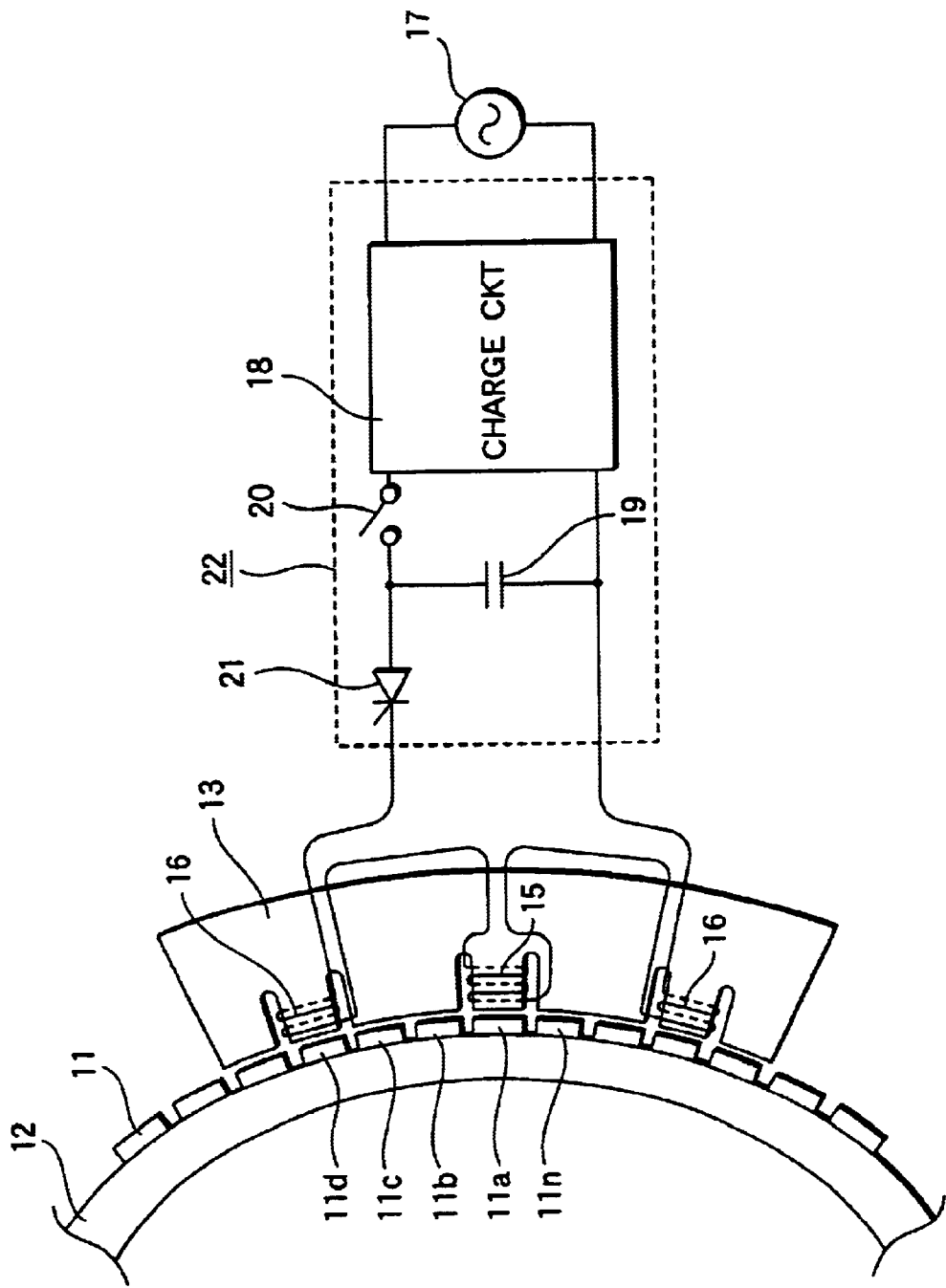
FIG. 1 is a schematic diagram showing the structure of a polarizing device of a permanent magnet rotor in embodiment 1 of this invention.
Figure 2:
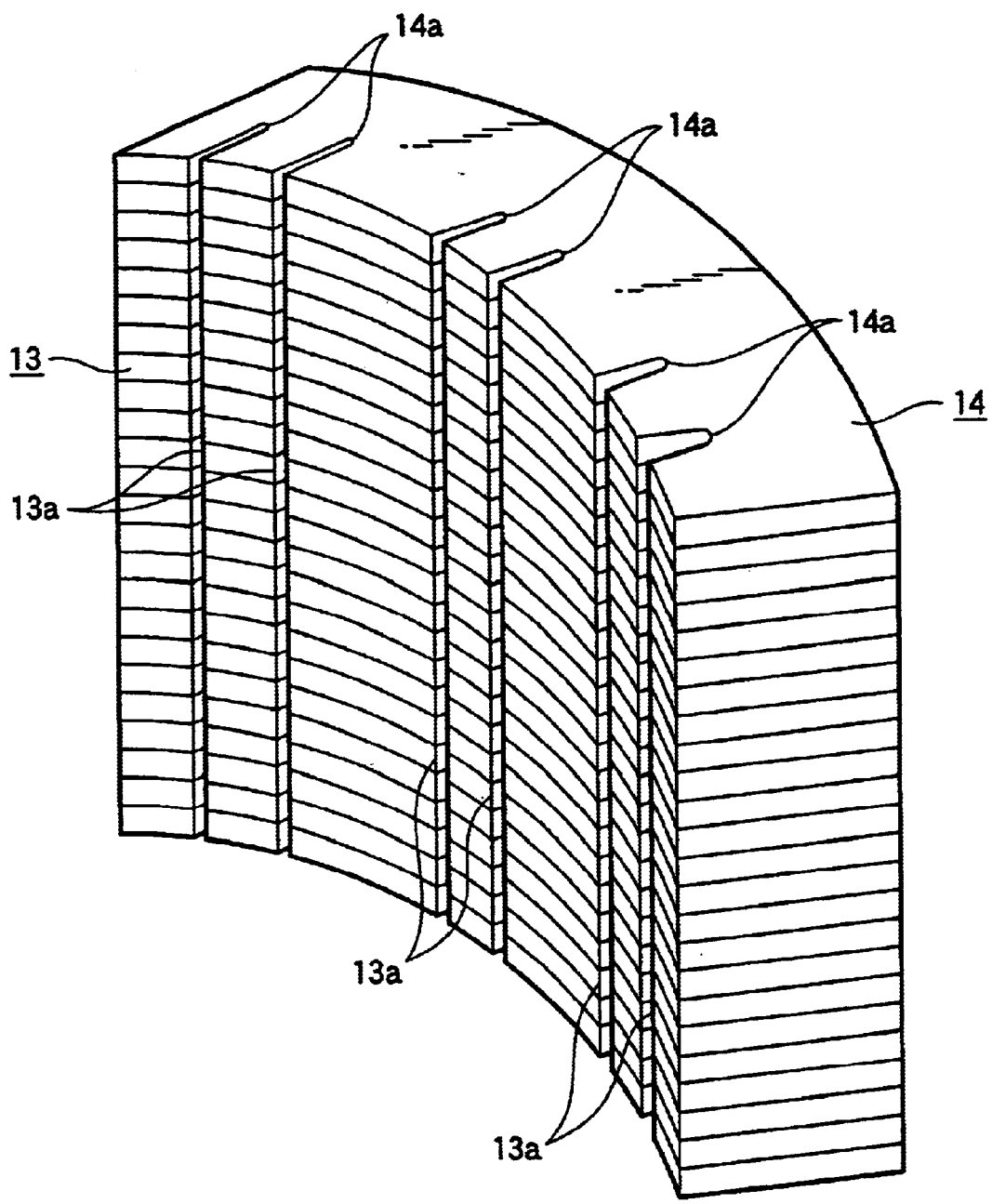
FIG. 2 is a perspective illustration showing the structure of a polarizing iron core in FIG. 1.
Figure 3:
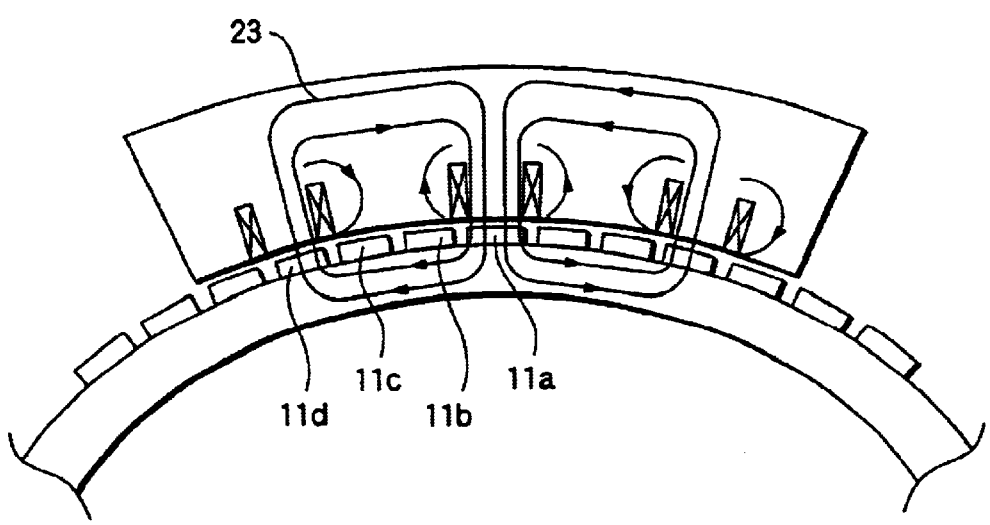
FIG. 3 is a figure showing the state of distribution of magnetic flux generated by the polarizing device of a permanent magnet rotor in FIG. 1.

FIG. 1 is a schematic diagram showing the structure of a polarizing device of a permanent magnet rotor in embodiment 1 of this invention, and FIG. 2 is a perspective illustration showing the structure of a polarizing iron core in FIG. 1, and FIG. 3 is a figure showing the state of distribution of magnetic flux generated by the polarizing device of a permanent magnet rotor in FIG. 1.

In the figure, reference numeral 11 denotes a plurality of unmagnetized permanent magnets arranged in the circumferential direction on the peripheral surface of a rotor 12 at specified intervals, and reference numeral 13 denotes a polarizing iron core arranged facing to a specified number of permanent magnets 11, and as shown in FIG. 2, it is formed by laminating a specified number of plate magnetic materials 14 in which a pair of notches 14a having a specified width and a specified depth are formed at three positions at specified intervals (in the figure, intervals corresponding to three permanent magnets 11), and a coil inserting groove 13a for winding each coil which is described later is formed by the notch 14a of each plate magnetic material 14.

Reference numeral 15 denotes a first coil to be wound and inserted into a pair of coil inserting grooves 13a at the central part of the polarizing iron core 13, and reference numeral 16 denotes a pair of second coils each of which is wound and inserted into each of the pair of grooves 13a at both end parts of the polarizing iron core 13, and each is wound in the direction different from that of the first coil 15 and by a number of windings of half the number of windings of the first coil 15 or less. Reference numeral 17 denotes a power source, and reference numeral 18 denotes a charge circuit for charging a condenser 19 from this power source 17, and it makes up a current supplying unit 22 together with a switch 20 to be closed at the time of charging and a discharging switch 21 to be closed at the time of discharging, and the like.

Next, the action of the polarizing device of a permanent magnet rotor in embodiment 1 having the described structure will be described.

First, in the state where the discharging switch 21 is opened, the switch 20 is closed, and the condenser 19 is charged from the power source 17 by the charge circuit 18. Then, when the condenser 19 is charged to a specified voltage, the current from the charge circuit 18 is passed to flow in the first and second coils 15, 16 by closing the discharging switch 21 after opening the switch 20. Then, as shown in FIG. 3, magnetic flux 23 is generated by both coils 15, 16, and for example, the permanent magnet 11a at a position corresponding to the first coil 15 is polarized to S-pole.

Then, the magnetic flux 23 generated in the first coil 15 at this moment is pulled by the second coil 16 and it is distributed to pass through the permanent magnet 11d, and therefore, it does not pass through the nearby permanent magnets 11b, 11c, and the permanent magnets 11b, 11c are not polarized in the opposite direction of the direction to be magnetized.

Next, when the polarizing of the permanent magnet 11a is finished, the rotor 12 is rotated only by a pitch of the permanent magnet 11, and the permanent magnet 11b is moved to the position corresponding to the first coil 15, and the direction of the flow of the current is switched by a current switching means (not shown), and the permanent magnet 11b is polarized to N-pole by letting the current flow in both coils 15, 16 from the charge circuit 18.

After that, by repeating the action similar to the described action, the permanent magnets 11c, 11d . . . 11n are alternately in turn polarized to S-pole and N-pole, and the polarization of all permanent magnets 11 is finished.

Thus, according to the described embodiment 1, to the polarizing iron core 13, a first coil 15 for polarizing a desired permanent magnet 11 and a pair of second coils 16 wound having an interval corresponding to three permanent magnets 11 on the basis of this first coil 15 in the direction different from that of the first coil 15 are provided, respectively, and the magnetic flux 23 generated by the first coil 15 at the time of polarizing of the permanent magnet 11a is pulled up to the position of the permanent magnet 11d which is polarized to have an opposite polarity of that of the permanent magnet 11a by the second coils 16, and therefore, it does not occur for the permanent magnets 11b, 11c near the permanent magnet 11a to be magnetized in the opposing direction, and it is unnecessary to control the demagnetizing or the like at the step of normal polarization, and therefore, the current can easily be controlled, and it does not occur for the current supplying unit 22 to be large-sized.

Furthermore, as mentioned above, the number of windings of the second coil 16 is half the number of windings of the first coil 15 or less, and therefore, it does not occur for the magnetic flux generated by the second coils 16 to have adverse effect on the nearby permanent magnet 11, and the magnetic flux 23 because of the first coil 15 can be pulled, and furthermore, the control of the current becomes easy.

Furthermore, the second coil 16 is wound in the direction different from that of the first coil 15, and therefore, even when the current is supplied from the same current supplying unit 22, it is possible to let the currents flowing in both coils 15, 16 flow in the different directions without using switching means or the like, and furthermore, the control of the current becomes easy.

Furthermore, by rotating the rotor 12, the relative positions of the permanent magnet 11 and the first coil 15 are moved, and therefore, the structure as a device can be simple.

(Embodiment 2)

Figure 4:
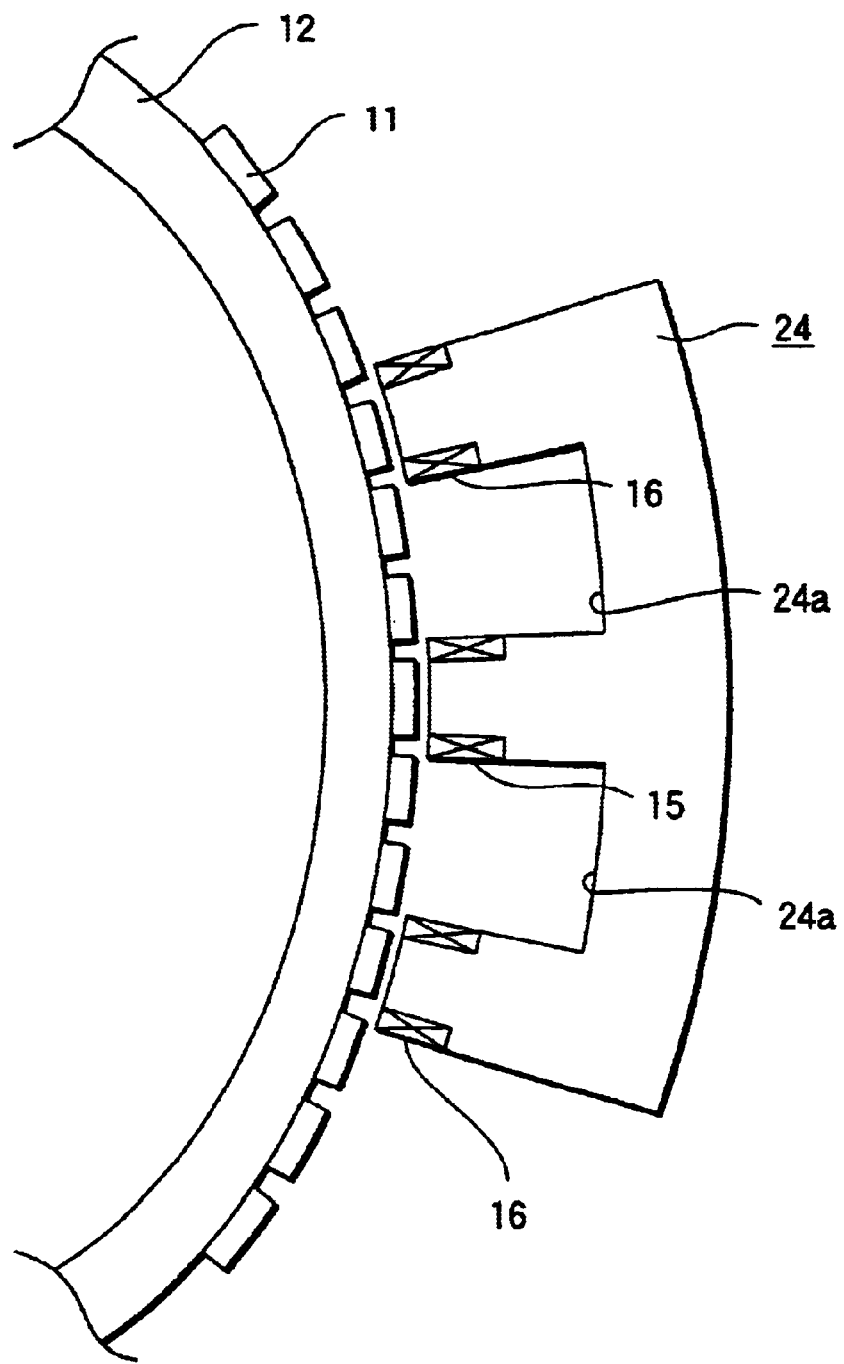
FIG. 4 is a plan view showing the structure of the main part of the polarizing device of a permanent magnet rotor in embodiment 2 of this invention.

FIG. 4 is a plan view showing the structure of the main part of the polarizing device of a permanent magnet rotor in embodiment 2 of this invention.

In the figure, the same reference marks are given to the parts similar to those in the described embodiment 1, and the description will be omitted.

Reference numeral 24 denotes a polarizing iron core formed by laminating a plurality of plate magnetic materials, similar to that in the described embodiment 1 (not shown), and a notch part 24a is formed near both sides of the first coil 15 expanding the clearance with the permanent magnet 11, respectively.

Thus, according to the described embodiment 2, by forming a notch part 24a near both sides of the first coil 15 of the polarizing iron core 24 respectively, the clearance with the permant magnet 11 is expanded, and therefore, it is prevented for the magnetic flux generated by the first coil 15 to form a closed loop near the first coil 15 and to give adverse effect on the nearby permanent magnet 11, and it can be arranged that almost all the magnetic flux is pulled to the second coil 16 side, and therefore, furthermore, the control of the current becomes easy.

As mentioned above, according to the first aspect of this invention, the device comprises: a polarizing iron core arranged facing to a specified number of permanent magnets among a plurality of unmagnetized permanent magnets arranged at specified intervals in the circumferential direction on the peripheral surface of a rotor; a first coil wound at a position facing to a desired permanent magnet of the polarizing iron core; a pair of second coils each of which is arranged having a specified interval on the basis of the first coil in the circumferential direction on the polarizing iron core and whose direction of the flowing current is different from that of the first coil; and a power source for supplying the current to the first and second coils, and either of the permanent magnet and first coil is relatively moved and each permanent magnet is magnetized to form a magnetic pole in turn by the current fed from the power source, and therefore, it is possible to provide a polarizing device of a permanent magnet rotor in which the effect of the opposing magnetic field to the permanent magnet is eliminated and the control of the current is easy.

Furthermore, according to the second aspect of this invention, in the device according to the first aspect, each second coil is arranged having an interval corresponding to at least three permanent magnets with the first coil, and therefore, it is possible to provide a polarizing device of a permanent magnet rotor in which the control of the current is furthermore easy.

Furthermore, according to the third aspect of this invention, in the device according to the first aspect, the second coils are wound in the direction different from that of the first coil, and therefore, it is possible to provide a polarizing device of a permanent magnet rotor in which the control of the current is furthermore easy.

Furthermore, according to the fourth aspect of this invention, in the device according to the third aspect, the second coils are wound by a number of windings of half the number of windings of the first coil or less, and therefore, it is possible to provide a polarizing device of a permanent magnet rotor in which the control of the current is furthermore easy.

Furthermore, according to the fifth aspect of this invention, in the device according to the first aspect, a notch part for expanding the clearance with the permanent magnet is formed near both sides of the first coil of the polarizing iron core, and therefore, it is possible to provide a polarizing device of a permanent magnet rotor in which the control of the current is furthermore easy.

Furthermore, according to the sixth aspect of this invention, in the device according to the first aspect, the permanent magnet is relatively moved by rotating the rotor, and therefore, it is possible to provide a polarizing device of a permanent magnet rotor in which it is possible to make the control of the current easy and it is possible to make the structure simple.

What is claimed is:
1. A polarizing device for a permanent magnet rotor comprising:
   a polarizing iron core arranged facing to a specified number of magnetizable members of a plurality of magnetizable members arranged at specified intervals in the circumferential direction on a peripheral surface of a rotor;
   a first coil wound at a position of the polarizing iron core facing to one of the magnetizable members;
   a pair of second coils each of which is arranged at a specified interval from the first coil in the circumferential direction on the polarizing iron core and whose direction of flow of current is different from that of the first coil; and
   a power source for supplying the current to the first and second coils;
   wherein one of the first coil and the magnetizable members is movable relative to the other and each of the magnetizable members is magnetized to form a magnetic pole in turn by the current fed from the power source.
2. The polarizing device for a permanent magnet rotor according to claim 1, wherein the second coils are arranged having an interval corresponding to at least three magnetizable members relative to the first coil, respectively.
3. The polarizing device for a permanent magnet rotor according to claim 1, wherein the second coils are wound in the direction different from that of the first coil.
4. The polarizing device for a permanent magnet rotor according to claim 3, wherein the second coils are wound by a number of windings of half the number of windings of the first coil or less.
5. The polarizing device for a permanent magnet rotor according to claim 1, wherein a notch part for expanding the clearance with the magnetizable members is formed near both sides of the first coil of the polarizing iron core.
6. The polarizing device for a permanent magnet rotor according to claim 1, wherein magnetizable members are moved relative to the first coil by rotating the rotor.
7. A polarizing device for a permanent magnet rotor, comprising:
   a polarizing member configured to face a specified number of magnetizable regions arranged at a circumferential surface of a rotor, the rotor having a total number of said magnetizable regions arranged at the circumferential surface of the rotor, the specified number of magnetizable regions being less than the total number of magnetizable regions;
   a first coil wound around a first portion of the polarizing member at a first position configured to face a first one of the magnetizable regions of the rotor;
   a second coil wound around a second portion of the polarizing member at a second position configured to face a second one of the magnetizable regions of the rotor, wherein a direction of current flow in the second coil is different from that of the first coil;
   a third coil wound around a third portion of the polarizing member at a third position configured to face a third one of the magnetizable regions of the rotor, wherein a direction of current flow in the third coil is different from that of the first coil; and
   a power source for supplying the current to the first, second and third coils,
   wherein the polarizing member is configured to magnetize the first one of the magnetizable regions at the first position by providing current from the power source, wherein the polarizing device is configured to provide relative motion between the rotor and the polarizing member and wherein the polarizing member is configured to magnetize each of the magnetizable regions in succession at the first position corresponding to the first coil using current from the power source, and wherein the second and third coils are disposed apart from the first coil by a distance such that intervening ones of the magnetizable regions to be magnetized are disposed between the first and second coils and between the first and third coils.

8. The polarizing device for a permanent magnet rotor according to claim 7, wherein the second and third coils are spaced apart from the first coil such that two intervening magnetizable regions are disposed between the first and second coils and such that two intervening magnetizable regions are disposed between the first and third coils.

9. The polarizing device for a permanent magnet rotor according to claim 7, wherein the second and third coils are wound in a direction opposite from that of the first coil.

10. The polarizing device for a permanent magnet rotor according to claim 9, wherein a number of windings of each of the second and third coils is less than or equal to half the number of windings of the first coil.

11. The polarizing device for a permanent magnet rotor according to claim 7, wherein a notch portion is provided in the polarizing member at each of two sides of the first coil, each notch portion providing a space between the polarizing member and the circumferential surface of the rotor.

12. The polarizing device for a permanent magnet rotor according to claim 7, wherein the rotor is moved relative to the polarizing member by rotating the rotor.

* * * * *